UNITED STATES PATENT OFFICE.

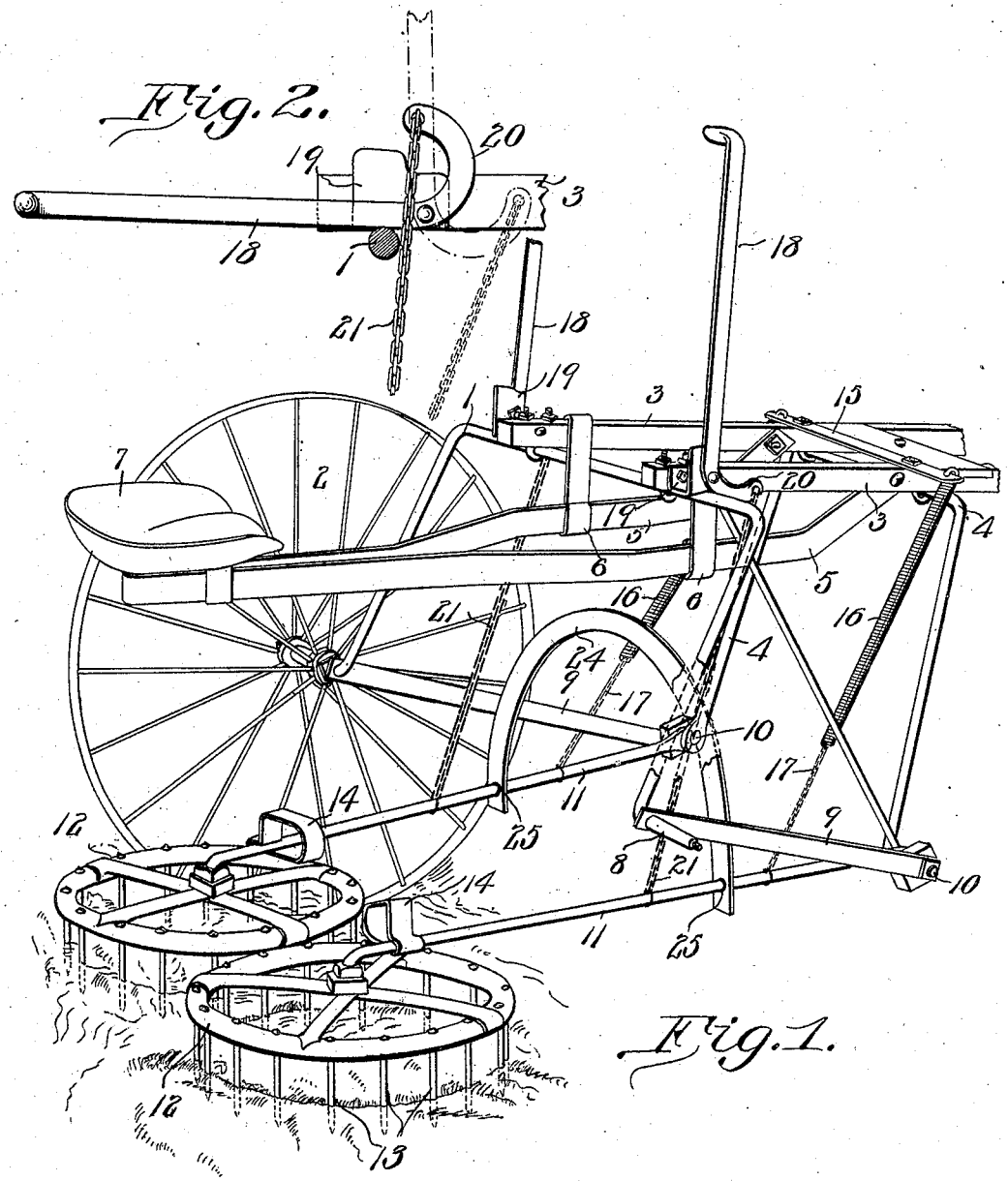

FLOYD A. PRICE, OF BEMIDJI, MINNESOTA, ASSIGNOR OF ONE-HALF TO FRANK SILVERSACK, OF BEMIDJI, MINNESOTA.

ROTARY CULTIVATING IMPLEMENT.

No. 805,972.     Specification of Letters Patent.     Patented Nov. 28, 1905.

Application filed August 19, 1905. Serial No. 274,886.

To all whom it may concern:

Be it known that I, FLOYD A. PRICE, a citizen of the United States, residing at Bemidji, in the county of Beltrami and State of Minnesota, have invented a new and useful Rotary Cultivating Implement, of which the following is a specification.

This invention relates to cultivating implements of that class which are equipped with horizontal rotary drags that are actuated by contact with the surface of the soil operated upon and which are connected with a wheeled frame, among the objects of the invention being to simplify and improve the construction and operation of this class of devices.

With these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of the invention, it being, however, understood that no limitation is necessarily made to the precise structural details therein exhibited, but that changes, alterations, and modifications within the scope of the invention may be resorted to when desired.

In said drawings, Figure 1 is a perspective view of a cultivating implement constructed in accordance with the principles of the invention, the near wheel having been removed. Fig. 2 is a detail side view of a portion of the device, including the operating end of one of the adjusting-levers.

Corresponding parts in both the figures are indicated throughout by similar characters of reference.

The frame of the machine includes an arched axle 1, having spindles for the support of the carrying-wheels, one of which appears in Fig. 1 of the drawings, (designated 2.) The axle supports the rear ends of the side members 3 3 of an ordinary bifurcated tongue, to the under sides of which an auxiliary front arch 4 is connected. The front ends of rearwardly-converging seat-bars 5 are bolted to the inner sides of the tongue members 3, and said seat-bars are additionally supported in hook members 6, depending from the tongue members near the rear ends of the latter. The seat 7 is suitably supported upon the bars 5.

The spindles 8 of the arched axle 1 are connected, by means of rigid bars 9, with the lower ends of the side members of the arch 4, which latter is thus permanently spaced from the axle. The bolts 10, which serve to connect the bars 9 with the arch 4, also constitute pivots for rearwardly-extending arms 11, which are downturned at their rear ends and which carry the rotary wheels or disks 12, which are supported to rotate in an approximately horizontal plane and which are equipped with downwardly-extending earth-engaging teeth or spikes 13. The bars 11 have stirrups 14, in which the operator may place his feet in order to depress the rotary disks when desired in order to render their operation more effective.

A cross-bar 15, supported upon the tongue members 3, has extended ends with which are connected springs 16, the lower ends of which are connected, by means of chains 17, with the disk-carrying bars 11, the tension of the springs being exercised to raise the disks from the ground. For the purpose of positively manipulating said disks bell-crank levers 18 are pivotally supported by means of foot-rest brackets 19, connected with the outer sides of the tongue members 3, near the rear ends of the latter. The long arms of said bell-cranks constitute the lever-handles, and the short arms 20, which are slightly curved, as shown, are connected, by means of chains 21, with the disk-carrying bars 11, which may thus be positively raised when desired.

The disk-carrying arms or bars 11 11 are connected with each other by means of an arch member 24, having apertures 25 for the passage of said arms 11, thus keeping the latter from spreading unduly. Said arms may also be variously spaced by properly adjusting the arch member 24, the width or straddle of which is slightly different from that of the arch member 4.

From the foregoing description, taken in connection with the drawings hereto annexed, the operation and advantages of this invention will be readily understood. By manipulating the levers 18 the earth-engaging spiked disks may be elevated from the ground to an inoperative position, the lift being facilitated by the springs 16. When the disks are lowered to an operative position, as shown in Fig. 1 of the drawings, they will drag over the ground, being meanwhile rotated by contact of the spikes with the ground, so as to uproot and destroy weeds and grass and to pulverize the soil. The operation may be facilitated and rendered more effective by the driver depressing the disks by placing his feet upon or in the stirrups 14, and in like manner the said disks may be eased from the ground, if desired.

The construction of the device is extremely simple, and it is practical and efficient in operation.

Having thus described the invention, what is claimed is—

1. In a device of the class described, a wheel-supported arched axle, an arch member spaced therefrom, bars rigidly connecting the spindles of the axle with the lower ends of the side members of the arch by means of connecting members, and disk-carrying bars pivoted upon the members connecting the bars with the side members of the arch.

2. A wheel-supported arched axle, an arched member spaced therefrom, and arms connected pivotally with the lower ends of the arch members; in combination with approximately horizontal toothed disks supported for rotation by said arms.

3. A wheel-supported arched axle, tongue members connected therewith, an arch supported by said tongue members, rigid connecting means between said arch and the spindles of the axle, implement-carrying arms supported pivotally at the lower ends of the arch members, and an intermediate arch member having apertures slidably engaging the implement-carrying arms.

4. A wheel-supported arched axle, an auxiliary arch spaced therefrom and rigidly connected therewith, implement-carrying arms supported pivotally by the auxiliary arch, springs exerting tension to elevate the free ends of said arms, and stirrups upon said arms whereby they may be depressed against the tension of said springs.

5. An arched axle having spindles, transporting-wheels upon said spindles, tongue members connected with the axle-arch, an auxiliary arch connected with said tongue members, bars rigidly connecting the free ends of the side members of the auxiliary arch with the spindles of the axle, implement-carrying arms connected pivotally with the free ends of the side members of the auxilary arch, foot-rest brackets secured upon the tongue members, bell-cranks pivoted upon said foot-rest members and having short curved arms, and flexible means connecting said arms with the implement-carrying arms.

6. A supporting-arch, implement-carrying arms connected pivotally with said supporting-arch, and an arch member having apertures slidably engaging the implement-carrying arms.

In testimony that I claim the foregoing as my own I have hereto affixed my signature in the presence of two witnesses.

FLOYD A. PRICE.

Witnesses:
O. M. SKINVIK,
ROBERT CLARK.